A. T. KEENE.
ROTARY MOTOR.
APPLICATION FILED MAR. 30, 1914.
1,166,598.
Patented Jan. 4, 1916.
4 SHEETS—SHEET 2.
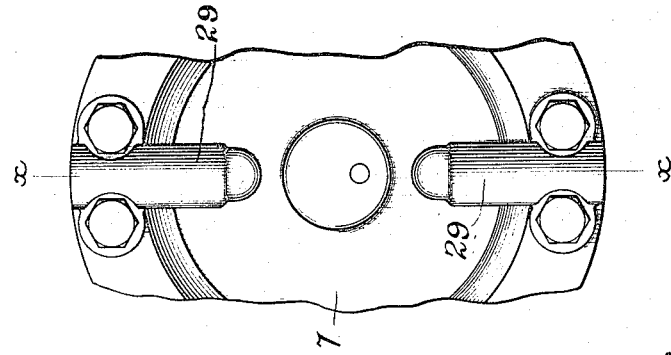
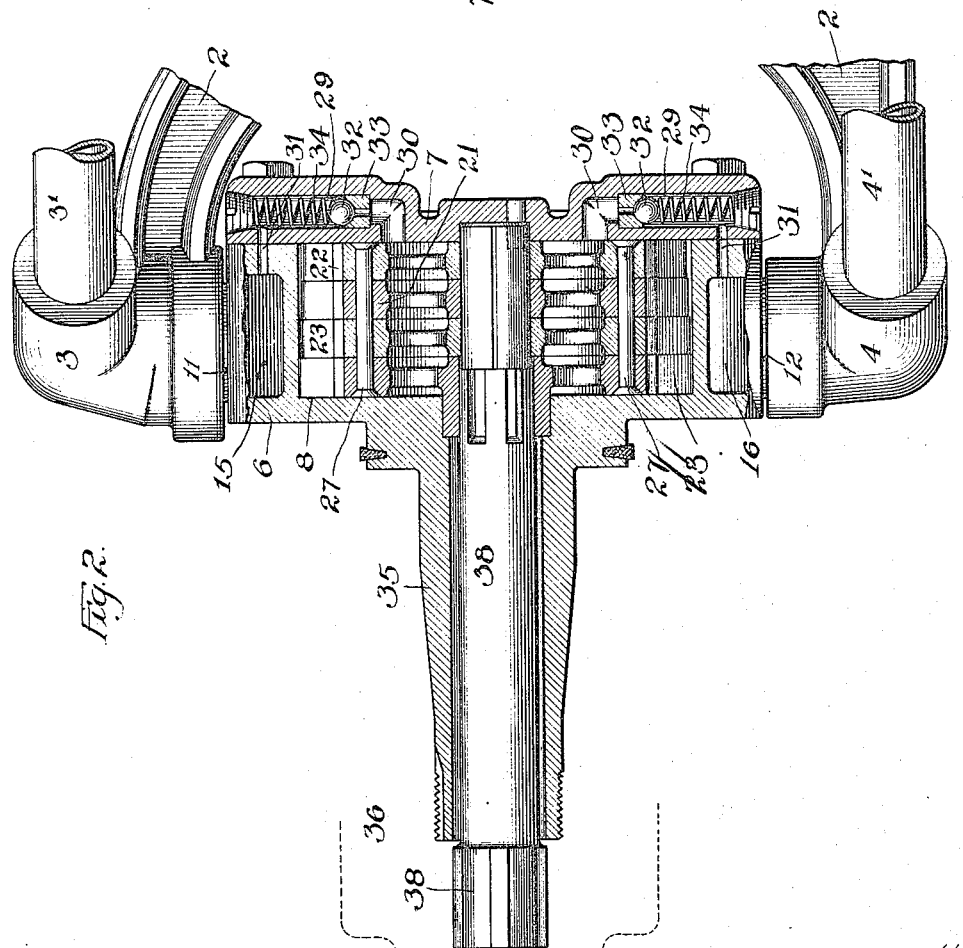
Witnesses:
Leo J. DuMais
Arthur B. Franke.
Inventor.
Archibald T. Keene.
by Robert Burns, Atty.

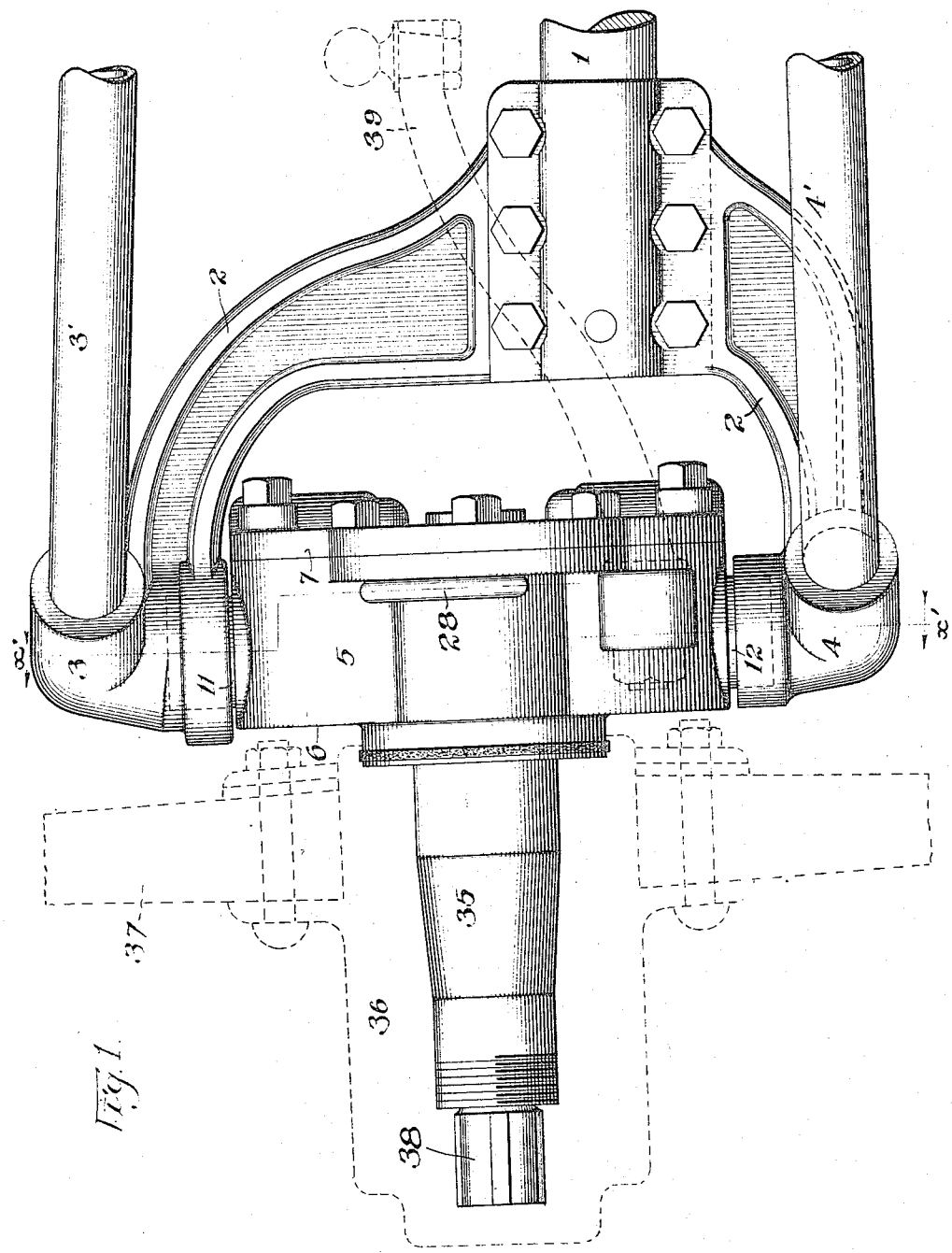

A. T. KEENE.
ROTARY MOTOR.
APPLICATION FILED MAR. 30, 1914.
1,166,598.
Patented Jan. 4, 1916.
4 SHEETS—SHEET 3.
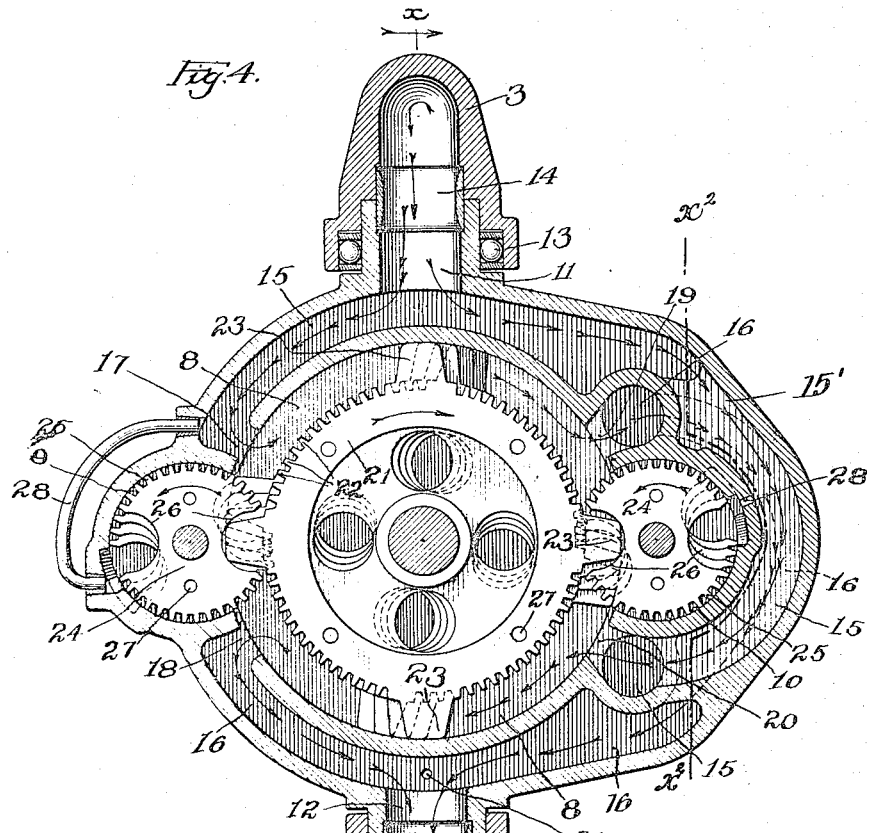
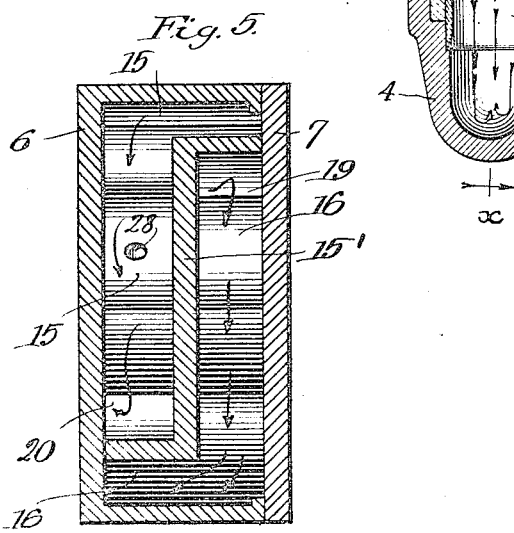
Witnesses:
Leo J. DuMais.
Arthur B. Franke.
Inventor.
Archibald T. Keene.
by Robert Runne Atty.

A. T. KEENE.
ROTARY MOTOR.
APPLICATION FILED MAR. 30, 1914.

1,166,598.

Patented Jan. 4, 1916.
4 SHEETS—SHEET 4.

UNITED STATES PATENT OFFICE.

ARCHIBALD T. KEENE, OF CHICAGO, ILLINOIS, ASSIGNOR, BY DIRECT AND MESNE ASSIGNMENTS, TO KEENE HYDRAULIC TRANSMISSION COMPANY, A CORPORATION OF ARIZONA.

ROTARY MOTOR.

1,166,598.  Specification of Letters Patent.  Patented Jan. 4, 1916.

Application filed March 30, 1914. Serial No. 828,330.

*To all whom it may concern:*

Be it known that I, ARCHIBALD T. KEENE, a citizen of the United States of America, and a resident of Chicago, in the county of Cook, State of Illinois, have invented certain new and useful Improvements in Rotary Motors, of which the following is a specification.

This invention relates to a rotary fluid impelled motor for use more especially in fluid power transmission systems for motor vehicles, such as form the subject matter of my application for patent Ser. No. 776,689 filed June 30, 1913. And the present improvement has for its object to provide a simple and efficient structural formation and combination of parts whereby the toothed periphery of the rotor member of the motor is maintained at all times in positive operative engagement with the toothed periphery of the rotary abutment member of the motor, and with a resulting compact and substantial arrangement of the motor parts.

Another object is to provide a simple formation and arrangement of the inlet passages of the motor shell or casing whereby the motive fluid is simultaneously supplied behind a plurality of the piston ribs of the rotor member, to move the same in its circular path.

Another object is to provide a simple and efficient arrangement of the passages and fluid cavities of the motor shell or casing, whereby the fluid pressure on opposite faces of the rotary stator or abutment member is effectively equalized or balanced, and lateral stress upon the carrying shafts thereof eliminated.

Another object is to provide a simple and durable structural formation of the motor shell or casing adapting the same for the direct support of a steering wheel of the motor vehicle, and with which pivotal connection is effected in a substantial manner with the forked end of the axle of the motor vehicle, with the introduction and removal of the motive fluid to and from the motor in a direct and simple manner, all as will hereinafter more fully appear.

Figure 6:
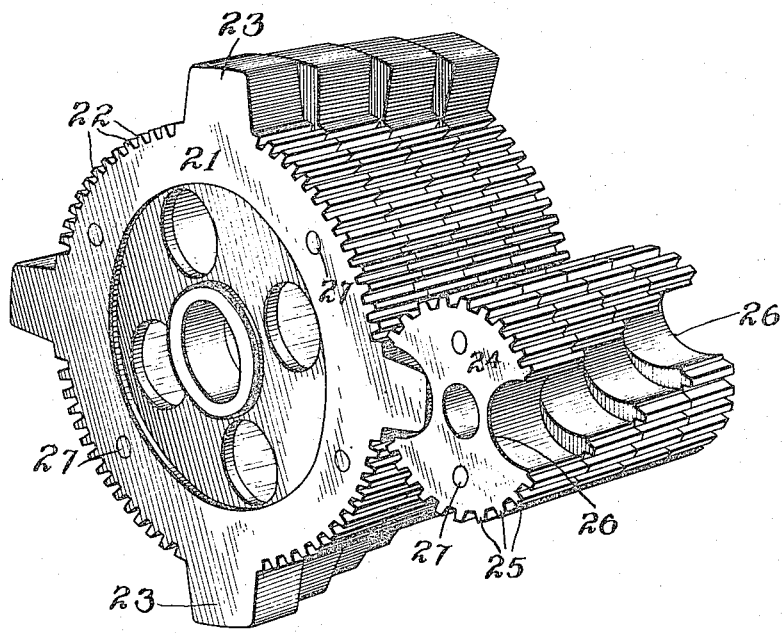
Figure 7:
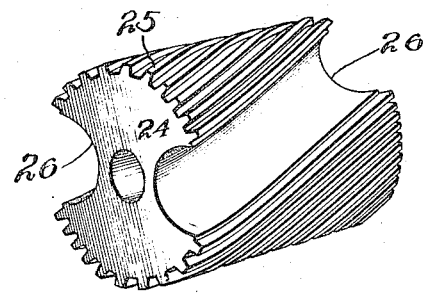

In the accompanying drawings: Figure 1, is a detail rear elevation illustrating the arrangement of the present motor in connection with a forked end of a fore axle and steering wheel of a motor vehicle. Fig. 2, is a sectional elevation of the same, partly on line $x$—$x$, Figs. 3 and 4. Fig. 3, is a fragmentary rear elevation of the motor shell or casing, showing body of relief valves. Fig. 4, is a general section of the motor, on line $x'$—$x'$, Fig. 1. Fig. 5, is a transverse sectional elevation, on line $x^2$—$x^2$, Fig. 4. Fig. 6, is a perspective view of the rotary piston member and a rotary abutment member of the motor, detached from the motor casing. Fig. 7, is a perspective view of modified construction of the rotary stator or abutment member.

Similar reference numerals indicate like parts in the several views.

Referring to the drawings, 1 represents a fore or fixed axle of a motor vehicle, formed with the usual end forks or yokes 2, which in the present improvement are formed with upper and lower tubular bearing heads 3, 4, disposed in vertical alinement and adapted to receive the hollow trunnions of the motor shell or casing, hereinafter described, and for connection with motive fluid supply and return pipes 3' and 4' as shown.

5 is the outer shell or casing of the motor, formed preferably with an integral front head 6, and with a removal rear head 7, attached in place by transverse stud bolts or other usual fastening means.

8 is the main circular chamber formed centrally in the motor shell or casing 5, and in concentric relation to the central bearing recess and orifice in the aforesaid heads 6 and 7, for the motor shaft and accessories hereinafter described.

9 and 10 are one or more marginal pockets or sub-chambers, preferably two in number and disposed in diametric relation in the shell or casing 5, and opening into the main chamber 8, aforesaid, as illustrated in Fig. 4.

11 and 12 are diametrically disposed hollow trunnions formed on the periphery of the shell or casing 5, and constituting portions of the hereinafter described motive fluid supply and return passages of the motor, as well as means for pivotally mounting the motor shell or casing 5, in the upper and lower bearing heads 3 and 4 of the end yoke 2, above described. In the construction shown, annular reduced extensions of the trunnions 11 and 12, fit corresponding counterbores in the tubular bearing heads 3 and 4, and one of said trunnions is provided with ball races, between which are disposed a series of bearing balls 13, with a view to afford effective pivotal bearings between the motor casing 4 and the axle yoke 2.

14 are packing sleeves or thimbles fitting the bores of the respective hollow bearing heads 3, 4, and trunnions 11, 12, at the points of juncture, with a view to prevent leakage of motive fluid at such point.

15 and 16 are upper and lower curved passages formed in the motor shell or casing 5, and preferably concentric with the main circular chamber thereof, as shown in Fig. 4. The middle portions of the respective passages 15 and 16 are in communication with the bores of the respective hollow trunnions 11 and 12, and as so connected each passage 15, 16, divides into branch passages extending to the right and to the left of a central trunk passage formed by a hollow trunnion 11, 12. In the construction shown the branches of upper and lower passages 15 and 16 which extend to the left in Fig. 4, are connected to the main chamber 8, by transverse ports 17, 18, at points directly adjacent to the sub-chamber 9 to the left in Fig. 4, and between said sub-chamber and the respective upper and lower hollow trunnions 11, 12.

The companion upper and lower branches of the passages 15 and 16 which extend to the right in Fig. 4 are connected to the main chamber 8 by upper and lower transverse ports 19 and 20, with the said branch of the upper passage 15, communicating with the aforesaid lower transverse port 20, and with said branch of the lower passage 16 communicating with the aforesaid upper transverse port 19. In the present construction illustrated in Figs. 4 and 5, a partition 15' of a Z shape is arranged between the ports 19 and 20 aforesaid to form the necessary separation between the respective branches or prolongations of the passages 15 and 16.

21 is the rotary piston member or rotor of the motor, fitting the main circular chamber 8 of the motor shell or casing 5, and preferably of the cylindrical form shown. The periphery of said rotor 21 is formed with gear teeth 22 intermediate of a plurality of larger teeth or ribs 23, which in the construction shown in Figs. 4 and 6 are four in number, equally spaced around the periphery of the rotor and having close contact or bearing against the inner circular surface of the main chamber 8 of the motor shell or casing to constitute a series of pistons which travel in a circular path in said main chamber, as usual in the present type of rotary motors.

24 are a pair of counterpart rotary abutment members fitting the sub-chambers or pockets 9, 10, of the motor casing 5, and preferably of the cylindrical form shown. The peripheries of said abutment members 24 are formed with gear teeth 25, intermediate of a pair of recesses 26, which constitute receiving pockets for the larger teeth or piston ribs 23 of the rotor 21, above described, in the practical operation of the motor. In the described construction the gear teeth 25 of the abutment members 24 are adapted to mesh with the gear teeth 22 of the rotor 21, to insure positive and proportional rotation of the respective members.

A material feature of the present improvement consists in a disposition and arrangement of the gear teeth 22 and piston forming ribs 23, of the rotor 21, and the gear teeth 25 and recesses 26, of the abutment members 24, in a plane oblique to the axis of rotation of the respective members, and so that with one of the piston forming ribs 23 of the rotor 21 moving within a recess 26 of an abutment member 24, the advance portions of the gear teeth 22, 25 next adjacent to said rib and recess, will come into mesh before the rear portions of said gear teeth 22, 25 have passed out of mesh. And as so constructed positive mesh between the gear teeth 22, 25 of the rotor 21 and abutment member 25 is constantly maintained, and in consequence a positive and proportional rotation of said parts is attained at all times in the practical operation of the motor.

In the attainment of the above described oblique arrangement of parts, the respective rotor and rotary abutment members may be formed as single units, with the gear teeth 22, 25, ribs 23, and recesses 26, constituting integral parts of said units, in the manner illustrated in Fig. 7. In the preferred construction of the present invention as illustrated in Figs. 4 and 6, the aforesaid rotor member 21, and abutment member 24, will each consist of a series of counterpart disk sections, which are formed with individual gear teeth 22 or 25, and ribs 23 or recesses 26, and rigidly secured together by transverse rivets 27 or other usual fastening means, with each successive disk like section aforesaid set a distance from the succeeding section, preferably equal to the pitch distance between two adjacent gear teeth 22, as illustrated in Figs. 4 and 6.

28 is a passage or pipe connecting a motive fluid supply passage, such as the passage 15, aforesaid, with a sub-chamber, such as the sub-chamber 9 containing an abutment member 24, and at a point opposite to the portion of such abutment member 24 which receives the pressure of the motive fluid in the main circular chamber 8. Such construction is adapted to introduce pressure at such opposite points in the sub-chamber, and equalize the pressure on opposite sides of a rotary abutment member, thus preventing lateral stress and friction on the journal of said abutment member, which would otherwise prevail.

29 are a pair of radial passages formed in the removable head 7 of the motor shell or casing 5, and communicating at their inner ends with the central portions of the main chamber 8 of said shell by lateral branch passages 30, and at their outer ends with the respective motive fluid passage 15 and 16, of the motor shell, by lateral branch passages 31. The purpose of said passage is to permit the motive fluid which leaks between the ends of the rotor 21 and the contacting faces of the end heads 6 and 7, into the central portion of the main chamber 8, to pass into the particular passage 15 or 16, which due to the direction in which the motor is rotating, constitutes the outlet passage from the motor. By such means excessive pressure or strain on the removable head 7 and on the bolts or other means employed to hold the removable head 7 of the motor shell in place, is effectively prevented.

32 are check valves associated with seats 33 in the aforesaid passages 29; and 34 are springs for yieldingly holding said valves to their seats. With the present valve arrangement either of said valves 32, is adapted to be unseated against the stress of its spring 34, by the pressure of the waste fluid passing through a particular passage 29 and into the passage 15 or 16, which may constitute the outlet of the motor as above set forth. On the other hand pressure motive fluid in a particular passage 29 pressing toward the central portion of the chamber 8 aforesaid, is adapted to hold the valve 32 of said passage to its seat, and prevent any waste of motive fluid into the central portion of the main chamber 8 aforesaid.

35 is a bearing sleeve formed integrally on the fixed forward head 6 of the motor shell or casing 5, and extending centrally therefrom to provide a bearing for the hub 36 of a motor vehicle wheel 37. Said bearing may be of any usual and suitable form, with the wheel hub held in place by any usual and ordinary means.

38 is the motor shaft attached at one end in the central portion of the piston or rotor 21, and attached at the other end to the hub 36. The outer portion of said motor shaft turns loosely in the bore of the bearing sleeve 35, and its outer end is in turn operatively connected to the wheel hub 36 in any usual and suitable manner.

39 is a steering arm connected to the motor shell or casing 5, for use in connection with the usual steering mechanism of a motor vehicle.

Having thus fully described my said invention what I claim as new and desire to secure by Letters Patent, is:—

1. In combination, a vehicle axle, a pivot yoke on said axle formed with diametrically opposed tubular bearings, motive fluid supply and return connections associated with said tubular bearings, a motor casing provided with tubular trunnions engaging the aforesaid tubular bearings, the motor casing being formed with supply and return passages and ports, and a rotor arranged in said motor casing, substantially as set forth.

2. In combination, a vehicle axle, a pivot yoke on said axle formed with diametrically opposed tubular bearings, motive fluid supply and return connections associated with said tubular bearings, a motor casing provided with tubular trunnions engaging the aforesaid tubular bearings, the motor casing being formed with a plurality of supply and return passages and ports, and a rotor arranged in said motor casing and provided with a plurality of peripheral piston ribs, substantially as set forth.

3. A rotary fluid motor comprising, a motor casing formed with supply and return passages and ports and with central and side chambers, a rotor disposed in said central chamber and formed with a toothed periphery and peripheral piston ribs, and a rotary abutment member disposed in an aforesaid side chamber and formed with a toothed periphery adapted to mesh with the toothed periphery of the rotor and with peripheral recesses adapted to receive the piston ribs of the rotor, the toothed peripheries of the rotor and rotary abutment member having an oblique arrangement with relation to the axis of rotation of the parts, substantially as set forth.

4. A rotary fluid motor comprising, a motor casing formed with supply and return passages and ports and with central and side chambers, a rotor disposed in said central chamber and formed with a toothed periphery and peripheral piston ribs, and a rotary abutment member disposed in an aforesaid side chamber and formed with a toothed periphery adapted to mesh with the toothed periphery of the rotor and with peripheral recesses adapted to receive the piston ribs of the rotor, the teeth, ribs and recesses of the rotor and rotary abutment member being obliquely arranged in relation to the axis of rotation of the parts, substantially as set forth.

5. A rotary fluid motor comprising, a motor casing formed with supply and return passages and ports and with central and side chambers, a rotor disposed in said central chamber and formed with a toothed periphery and peripheral piston ribs, and a rotary abutment member disposed in an aforesaid side chamber and formed with a toothed periphery adapted to mesh with the toothed periphery of the rotor and with peripheral recesses adapted to receive the piston ribs of the rotor, the teeth, ribs and recesses of the rotor and rotary abutment member having stepped formations providing oblique arrangements with relation to the axis of rotation of the parts, substantially as set forth.

6. A rotary fluid motor, comprising a casing formed with a central piston chamber and with a pair of marginal abutment chambers communicating with said central chamber, said casing having branched inlet and outlet passages communicating with the central chamber at points adjacent to the marginal chambers, a Z shaped partition associated with the branch passages at one side of the casing and separating said passages as they extend past each other for remote individual connection with the central piston chamber, a rotor arranged in said piston chamber and provided with a plurality of piston ribs, and rotary abutment members arranged in the abutment chambers and provided with peripheral recesses for receiving the piston ribs of the rotor, substantially as set forth.

7. A rotary fluid motor, comprising a casing formed with a central piston chamber and with a pair of marginal abutment chambers communicating with said central chamber, said casing having branched inlet and outlet passages communicating with the central chamber at points adjacent to the marginal chambers, a Z shaped partition associated with the branch passages at one side of the casing and separating said passages as they extend past each other for remote individual connection with the central piston chamber, a rotor arranged in said piston chamber and formed with a toothed periphery and peripheral piston ribs, and counterpart rotary abutment members arranged in the abutment chambers and formed with toothed peripheries adapted to mesh with the toothed periphery of the rotor and with peripheral recesses for receiving the piston ribs of said rotor, substantially as set forth.

Signed at Chicago, Illinois, this 27th day of March, 1914.

ARCHIBALD T. KEENE.

Witnesses:
 THOMAS RHODUS,
 ROBERT BURNS.